United States Patent [19]

Peterson, Sr.

[11] 3,968,588

[45] July 13, 1976

[54] FISH CLAMPING APPARATUS

[76] Inventor: Roy L. Peterson, Sr., Rte. 1 Box 217, Wewahitchka, Fla. 32465

[22] Filed: July 29, 1975

[21] Appl. No.: 600,152

[52] U.S. Cl. .................................... 43/53.5; 17/70
[51] Int. Cl.² .................................... A01K 97/00
[58] Field of Search ............. 43/4, 55, 53.5; 17/70; 294/67 BC; 119/151

[56] References Cited
UNITED STATES PATENTS

| | | | |
|---|---|---|---|
| 2,741,061 | 4/1956 | Harrison | 43/53.5 |
| 2,750,705 | 6/1956 | Keveney | 43/53.5 |
| 3,500,495 | 3/1970 | Morse | 17/70 |

*Primary Examiner*—Warner H. Camp
*Attorney, Agent, or Firm*—Marcus L. Bates

[57] ABSTRACT

A clamping device for grasping and holding a live, hooked fish, consisting of spaced jaw members made to close together and open apart by a foot-actuated toggle arrangement. The apparatus is attachable to a live well of a fishing boat. The jaws are normally biased together, thereby freeing one's hands so that manipulation of the fish and hook is possible.

9 Claims, 6 Drawing Figures

U.S. Patent July 13, 1976 3,968,588
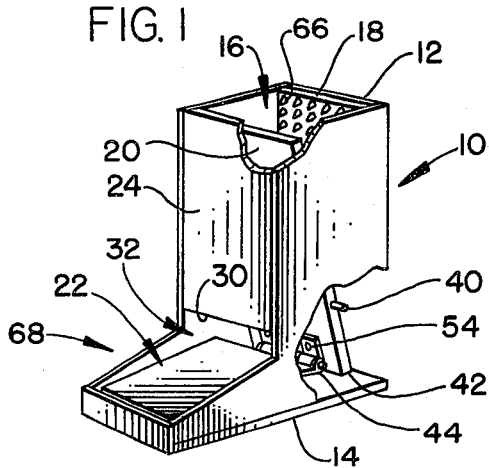
FIG. 1
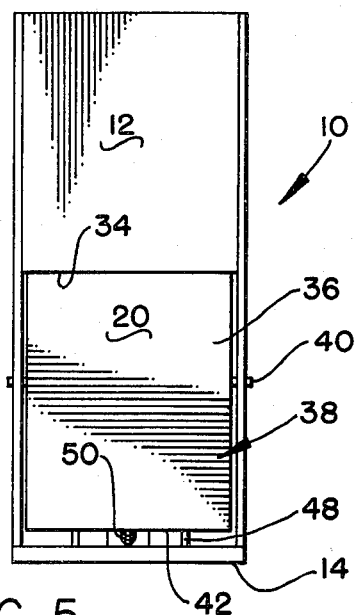
FIG. 4
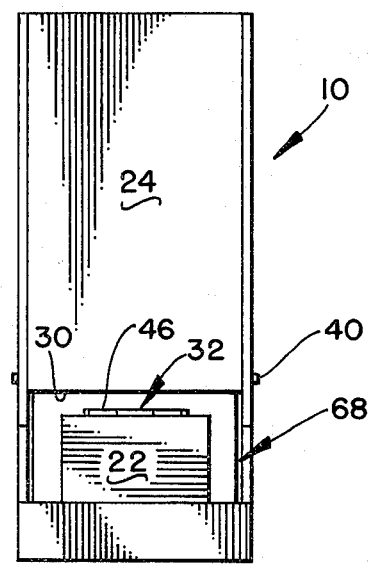
FIG. 5
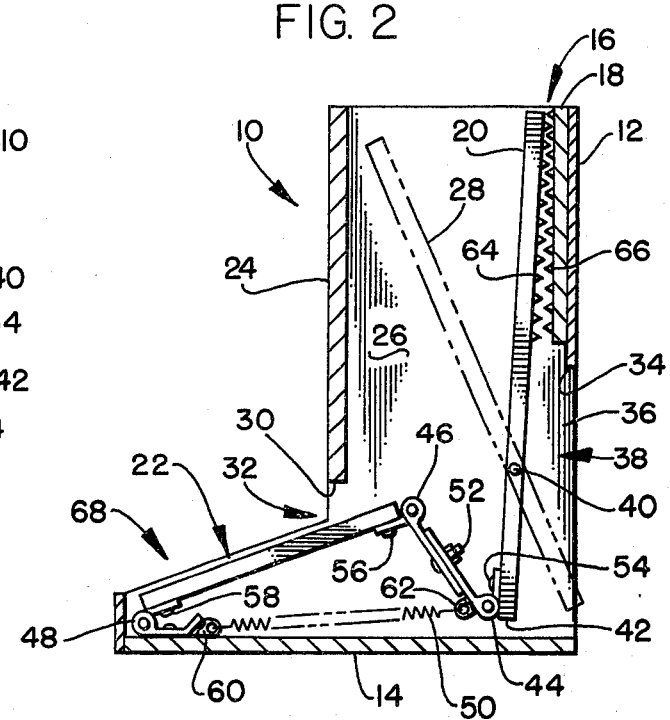
FIG. 2
FIG. 3
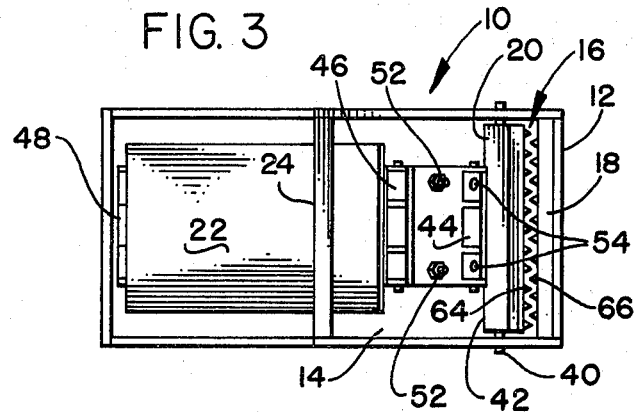
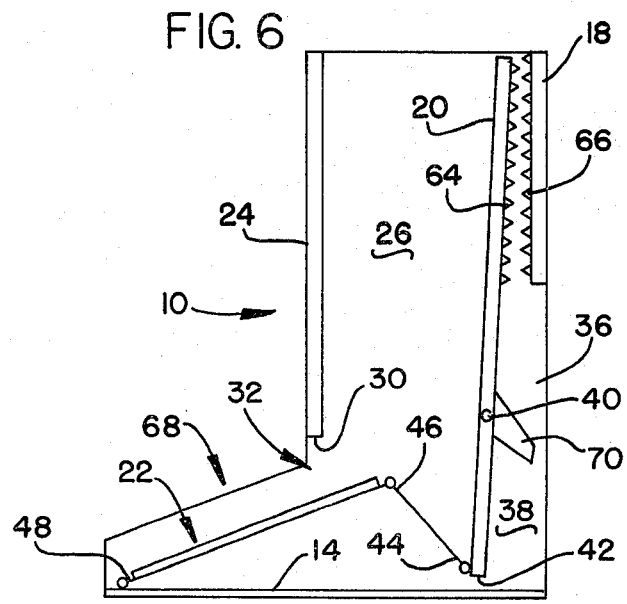
FIG. 6

FISH CLAMPING APPARATUS

BACKGROUND OF THE INVENTION

Fishing is a tremendous sport, and is enjoyed by many people. There are those who detest contacting the wet or slimy fish with their hands because of their fastidious nature. Many persons object to physically contacting a live fish with their bare hands because they associate the foreign matter found on the surface of the fish with dirty, smelly slime. Other people rightfully have a fear of being finned or otherwise injured by the live fish. Accordingly, it is desirable to provide an aid to fishermen who do not want to place their hands directly in contact with the fish he has caught. Therefore, it is desirable to protect fishermen from the above undesirable attributes associated with fishing by the provision of an apparatus for holding the fish until the hook can be removed therefrom, whereupon the fish can then be mechanically transferred into a live box or ice chest, as may be desired.

It is furthermore desirable that such an aid to fishermen be spring loaded and have included therein a foot-actuated pedal for actuation of the device, thereby freeing one's hands for enabling proper manipulation of the fish.

THE PRIOR ART

Garrison — U.S. Pat. No. 3,541,722
Haskell et al. — U.S. Pat. No. 3,556,507
Woodcock — U.S. Pat. No. 2,857,705
Naill — U.S. Pat. No. 3,738,050
Pomeroy et al. — U.S. Pat. No. 1,587,181
Halote — U.S. Pat. No. 2,491,972
Baumann — U.S. Pat. No. 747,033

SUMMARY OF THE INVENTION

A clamping device for grasping and holding a live, hooked fish, so that the fish can be firmly retained until the hook is removed therefrom, and the fish thereafter properly stored. The apparatus comprises normally closed, spaced jaw members made to open apart by the action of a foot-actuated toggle, and attachable to a live well of a fishing boat, or placed in close proximity to an ice chest. The jaws are normally biased together, thereby freeing one's hands so that manipulation of the hook with respect to the fish can be successfully carried out.

More specifically, the present invention is related to a housing having a movable and fixed jaw member associated therewith, a toggle means, and a lever means for moving the movable jaw respective to the fixed jaw. The fixed jaw is supported in a manner to form a rear wall, while the movable jaw is journaled in a manner to form a fish-conveying chute. The lever means is journaled to the toggle means, and the latter journaled to the movable jaw. The movable jaw, lever means, and toggle means are connected together in such a manner that movement of the lever forces the movable jaw away from the fixed jaw. An outlet is formed in underlying relationship with respect to the fixed jaw and arranged whereby movement of the movable jaw away from the fixed jaw forms an inclined chute along which the fish is conveyed through said outlet.

Accordingly, a primary object of the present invention is the provision of improvements in clamping apparatus for grasping and holding live, hooked fish, so that the hook can be easily removed therefrom without the necessity of physically contacting the fish with one's hands.

A further object of the present invention is the provision of a clamping apparatus for use in detaching hooks from live, hooked fish, which has a jaw associated therewith, with the jaw forming a chute means for conveying the fish from the jaws to a storage area.

Still another object is the provision of improvements in clamping apparatus for securely restraining a fish so that manipulation thereof can be carried out without physiclly contacting the fish with one's hands.

A still further object of this invention is to disclose and provide a foot-actuated clamping apparatus, having jaws normally biased toward one another, with one of the jaws forming a chute, so that a fish placed between the jaws can be manipulated, and thereafter the fish is transferred to a storage area by the action of the jaws being moved apart.

Another and still further object of this invention is to provide a fish-holding apparatus by which a person can hold a hooked, live fish motionless while a fish hook is removed therefrom.

These and various other objects and advantages of the invention will become readily apparent to those skilled in the art upon reading the following detailed description and claims and by referring to the accompanying drawings.

The above objects are attained in accordance with the present invention by the provision of apparatus made in accordance with structure such as defined in the above abstract and summary.

BRIEF DESCRIPTION OF THE DRAWINGS

FIG. 1 is a perpective frontal view of a fish clamping apparatus made in accordance with the present invention, with some parts thereof being removed therefrom so as to disclose the relationship of some of the remaining parts which are otherwise hidden therewithin;

FIG. 2 is an enlarged, part cross-sectional side view of the apparatus disclosed in FIG. 1;

FIG. 3 is a top plan view of the apparatus disclosed in FIG. 2;

FIG. 4 is an end view of the apparatus disclosed in FIG. 2;

FIG. 5 is a front view of the apparatus disclosed in FIG. 2; and,

FIG. 6 is a part schematical, part diagrammatical representation of the invention disclosed in FIGS. 1–5, showing some of the operative details thereof, and additionally including other novel features therein.

DETAILED DESCRIPTION OF THE PREFERRED EMBODIMENT

In the various figures of the drawing, there is disclosed a fish clamping apparatus 10 for grasping and holding a live, hooked fish. The apparatus includes a rear wall 12 supported from a base 14 so that live, hooked fish may be placed tail down within the upwardly opening jaw space 16. A fixed jaw 18 is attached to and forms part of the rear wall, while a movable jaw 20 varies the size of the jaw space as the jaw is moved toward or away from the rear wall.

A lever means in the form of a foot-actuated pedal 22 extends through a forwardly directed opening formed within the forward wall 24 of the apparatus. The various walls positioned about the outer perimeter of the apparatus forms a chamber 26 within which the movable jaw can be actuated as the jaw is moved into the dot-dash configuration exemplified by the numeral 28. The forwardly directed opening found in the forward wall has an uppermost portion defined by a lower edge portion 30, with the arrow at numeral 32 broadly indicating the opening.

Edge portion 34 of the rear wall defines the upper end of an outlet 36. The movable jaw forms a chute in proximity to the arrow at numeral 38 so that a fish placed within the jaw space 16 can be transported down one surface of the movable jaw member and through the outlet.

Shaft 40 is connected to a medial portion of the movable jaw member, with the distal ends thereof being journaled to the illustrated opposed sidewalls. The side walls are normally disposed respective to a major plane formed by the movable jaw member. The lowermost extremity 42 of the movable jaw member is hinged to a toggle means by means of a hinge means seen at 44. The remaining end portion of the toggle means is hinged by hinge means 46 to a free depending end portion of the pedal. Hinge means 48 forms a journal means by which the pedal is pivotally attached to the base of the apparatus. A biasing means in the form of a spring 50 biases hinge 44 toward hinge 48. Fastener means 52, 54, 56, and 58 maintain the various coacting members properly attached to one another and in operative relationship therewith.

A combination stop means and anchor means 60 serves the dual purpose of anchoring one end of biasing means 50 as well as limiting the downward motion of th pedal. The remaining and opposed end portion of the biasing means is affixed to an ear 62 formed on a proximal portion of the toggle means.

High friction material, such as expanded metal or protrusions 64 and 66, are formed on adjacent faces of each of the jaws so that a fish, when placed therebetween, is secured or immobilized with a minimum of biasing force.

As best seen in FIG. 6, one side of the pedal 68 can be provided with a built up foot-receiving portion which can take on any number of different forms, and which more conveniently receives the shoe of one's foot thereon. A downwardly sloped, outwardly directed guide means 70 can be affixed to a lower marginal portion of the rear side of the movable jaw enhance guiding a fish from the jaws and through the outlet 36, so that the fish is more efficiently transported into a live well of a fishing boat.

OPERATION

A hooked fish is suspended by the fishing line in superimposed relationship respective to the jaw space 16. One's foot is placed upon pad 68 of the lever means, and the pedal is depressed in a downward direction, thereby imparting a pivotal motion into the movable jaw member because of the resultant force imparted thereto by the action of the toggle means. This force moves jaw 20 into the illustrated dot-dash position seen indicted by numeral 28, thereby enabling the fish to be placed tail down within the jaw space, whereupon the foot is then removed from the pedal. The fish is now held immobilized between the jaws. The hook can next be removed from the restrained fish by employing a pair of pliers, or the hook can instead be directly manipulated by using one's hand if extreme care is exercised. After the hook has been removed from the fish, the pedal is again depressed by one's foot, and the fish is released, whereupon the force of gravity causes it to then slide down the rear surface of the movable jaw, and through the outlet 36. It is preferred that a live well of a boat, or alternatively an ice chest, be placed in close proximity of the outlet so that the fish can be transferred thereinto.

As seen illustrated in various ones of the figures of the drawings, the toggle means is provided with slotted adjustment means by which the linkage thereof can adjusted as may be required.

As specificlly seen in FIG. 6, it is often desirable to impart additional horizontal movement into the path of travel of the fish after it has been released from the jaw space; and accordingly, the downwardly and outwardly directed guide means 70, which extends from edge portion to edge portion of the movable jaw member, can be incorporated into the invention to facilitate the above desired expedient.

One important feature of this invention lies in the ease with which the rear wall thereof can be attached to an ice box by merely placing wood screws, or the like, into the rear portion of the side wall structure thereof. This prevents the apparatus from turning over, or from sliding about the boat. Furthermore, the present invention enables a fish to be placed on a string without any direct handling thereof by placing the fish within the device at a location which disposes the gills slightly above the jaws, thereby presenting the gills and entire fish head at an optimum position for enabling the fish to be strung with great ease. After the fish has been received upon the string, the pedal is again depressed to release the strung fish, which can then be lifted free of the apparatus and placed within the water adjacent to the boat.

I claim:
1. A clamping apparatus for grasping and holding a live, hooked fish between fixed and movable jaws comprising spaced walls defining an upwardly opening housing, a movable jaw member, a fixed jaw member, said fixed jaw member being formed on one of said walls; said movable jaw member having a medial and opposed distal portions, means by which said medial portion of said movable jaw member is pivotally secured to said housing;

means forming a jaw on one said distal portion of said movable jaw member;

a pedal including means by which it is movably affixed to said housing; said pedal having a movable free end portion; a toggle pivotally connected to said free end portion of said pedal and to the distal portion of said movable jaw member which is opposed to said jaw.

2. The clamping apparatus of claim 1 wherein said spaced walls includes an end wall, a lower outlet formed in said end wall, said distal portion of said member which is opposed to said movable jaw being moved into said lower outlet when said pedal is actuated to move said movable jaw away from said fixed jaw, thereby forming a chute through which fish are guided through said outlet when a fish is released from the jaws.

3. The clamping apparatus of claim 1 wherein said pedal has a hinged end affixed to said housing opposed to the toggle pivotal end, means for biasing said distal portion of said member which is opposed to said movable jaw towards the hinged end of said pedal, so that the two jaws are biased towards one another.

4. The clamping apparatus of claim 1 wherein said movable jaw is journaled to opposed side walls at a location whereby the jaws, when fully opened, form downwardly coverging wall portions to thereby enhance the grasping action thereof.

5. Apparatus for holding live fish to facilitate manipulation thereof comprising a housing having opposed side walls, a movable jaw member, a fixed jaw member, a toggle means, a lever means for moving said movable jaw member respective to said fixed jaw member;

said fixed jaw member being supported normally to said opposed side walls, means by which said movable jaw member is journaled to said opposed side walls and movable towards and away from said fixed jaw member, means biasing said movable jaw member towards said fixed jaw member;

said lever means being journaled to said toggle means said toggle means being journaled to said movable jaw member, means by which said lever means, toggle means, and movable jaw member are connected such that movement of said lever means in one direction forces the movable jaw member away from said fixed jaw;

and means forming an outlet in underlying relationship respective to said fixed jaw member and arranged respective to said movable jaw member such that a chute is formed from each of said jaw members to said outlet, when said jaw members are forced apart.

6. The apparatus of claim 5 wherein said opposed side walls include an end wall, said outlet being formed in said end wall, said movable jaw having a medial portion and opposed distal portions; a fish engaging surface formed on one of said distal portions with the remaining of said distal portions being moved into said outlet when said lever means is actuated to move said fish engaging surface away from said fixed jaw, thereby forming said chute through which fish are guided through said outlet when a fish is released from the jaws.

7. The apparatus of claim 5 wherein said lever means comprises a pedal which has a hinged end opposed to said toggle journaled end, said movable jaw member includes a distal portion which is opposed to a jaw portion, said biasing means urging said distal portion of said movable jaw member towards the pivoted end of said pedal, so that the fixed and movable jaws are biased towards one another.

8. The apparatus of claim 5 wherein said movable jaw member is journaled to opposed side walls of said housing at a location whereby the jaws, when fully opened, form downwardly converging wall portions to thereby enhance the guiding action thereof.

9. The apparatus defined in claim 5 wherein said movable jaw member further includes an additional guide means for guiding a fish through said outlet.

* * * * *